3,331,865
ALPHA-CHLORINATED POLYCHLORO-
PHENYLACETIC NITRILES
Edward D. Weil, Lewiston, Edwin Dorfman, Grand Island, and Jerome Linder, Niagara Falls, N.Y., assignors to Hooker Chemical Corporation, Niagara Falls, N.Y., a corporation of New York
No Drawing. Filed May 25, 1964, Ser. No. 370,087
5 Claims. (Cl. 260—465)

This invention relates to compositions of matter which are intermediates for and derivatives of phenylacetic acids which are both ring and side-chain chlorinated.

This is a continuation-in-part of our co-pending applications SN 797,892, filed Mar. 9, 1959, now U.S. Patent 3,134,808, and SN 22,658, filed Sept. 10, 1962, now U.S. Patent 3,218,146.

The present invention resides in compounds having the structure:

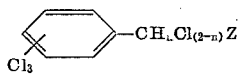

where Z is

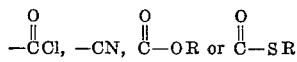

R being alkyl, mononuclear aryl, substituted alkyl or substituted aryl, and $n$ is from 0 to 1. The present compounds have properties as herbicides and chemical intermediates not logically predictable from the properties of related compounds. Examples of such compounds are 2,4,5,α-tetra-chlorophenylacetyl chloride; ethyl-2,4,5,α,α-pentachlorophenylacetate; butyl - 2,3,4,α - tetrachlorophenyl-thioacetate; 2,3,4,α,α - pentachlorophenylacetyl chloride; 2,3,6,α-tetrachlorophenylacetyl nitrile and α-methoxy-2,3,6-trichlorophenylacetyl chloride.

In place of the acid chlorides of the alpha chlorinated acids, the other halogen derivatives, such as the acid bromides, fluorides and iodides may be employed. Also, the other halogens may also replace the alpha and ring substituted chlorines or a part thereof. The esters and thioesters are preferably those of lower aliphatic alcohols of 1 to 5 carbon atoms but higher esters of alcohol of up to about 18 carbon atoms may also find use.

Descriptions of preparation of the invented compounds follow.

Trichlorophenylacetic acids are chlorinated in the molten state or in an organic solvent resistant to chlorination, such as carbon tetrachloride. This reaction is advantageously accelerated by ultraviolet light of by catalytic amounts of organic peroxides. Alternatively, the acids may be prepared by the chlorination of the corresponding phenylacetonitrile to introduce one or two chlorine atoms, as desired, into the α-position, followed by controlled hydrolysis of the nitrile to the acid, which may then be converted to an acid chloride, ester or thio ester.

Another method synthesis of the side-chain chlorinated products may be begun with the direct chlorination of phenylacetic acid to simultaneously or consecutively introduce ring and side-chain chlorine. Still another process involves the reaction of the corresponding isomer of trichloromandelic acid with hydrogen chloride, thionyl chloride, or phosphorus chlorides. Using the last two reagents, the acid chlorides may be obtained directly.

The acid products used in this invention are colorless crystalline solids soluble in most organic solvents and having only slight solubility in water.

Specific instances of preparations of compounds of this invention and intermediates for their manufacture are given in the following examples. All parts are by weight and all temperatures are in degrees centigrade unless otherwise indicated.

EXAMPLE 1

2,4,5,α-tetrachlorophenylacetic acid

Twenty-four parts by weight of 2,4,5-trichlorophenylacetic acid are warmed until fusion occurs and chlorine gas is then passed in while the acid is illuminated by a 250 watt mercury vapor lamp. When the weight of the reaction mixture reaches 29 parts, the mixture is recrystallized from carbon tetrachloride, giving a colorless crystalline product having a melting point of 157° C. to 159° C. The neutralization equivalent by titration with NaOH to form the sodium salt was 274 (theory for $C_8H_4Cl_4O_2=274$).

Analysis.—Calculated for $C_8H_4Cl_4O_2$, total Cl=51.8%. Found: 52.3%. Calculated Cl hydrolyzable by alcoholic KOH=12.9%. Found: 12.7%.

EXAMPLE 2

2,4,5,α,α-pentachlorophenylacetic acid

Chlorine gas was run into a solution of 24 parts of 2,4,5-trichlorophenylacetic acid in 300 parts of hexachlorobutadiene at 120° C. to 130° C. over a four-hour period. The solution was cooled to 20° C., then filtered and the crystals thus obtained were washed with hexane. The yield was 22 parts of colorless product of melting point of 164° C. to 166° C. The product, after recrystallization from carbon tetrachloride melted at 168.5° C. to 169° C. Titration with 0.1 Normal aqueous sodium hydroxide (giving a water-soluble sodium salt) indicated a neutralization equilavent of 307 (theory for $C_8H_3Cl_5O_2=308.3$).

Analysis.—Calculated for $C_8H_3Cl_5O_2$, total Cl=57.5%. Found: 58.0%. Calculated Cl hydrolyzable by alcoholic KOH=23.0%. Found: 22.9%.

EXAMPLE 3

2,3,6,α-tetrachlorophenylacetic acid

Chlorine gas is passed into a refluxing mixture of 60 parts of 2,3,6-trichlorophenylacetic acid and 400 parts of carbon tetrachloride under illumination by a 250 watt mercury vapor lamp. When 9 parts of hydrogen chloride have been evolved, the solvent is concentrated to about one-quarter of its former volume, cooled, and filtered. The crystalline solid thus obtained melts at 156° C. to 158° C. The neutralization equivalent by titration with NaOH to form the sodium salt was 275 (theory for $C_8H_4Cl_4O_2=274$).

Analysis.—Calculated for $C_8H_4Cl_4O_2$, total Cl=51.8%. Found: 51.4%. Calculated Cl hydrolyzable by alcoholic KOH=12.9%. Found: 12.7%.

EXAMPLE 4

Mixture of 2,3,4,α-, 2,4,5,α- and 2,3,6,α-tetrachlorophenylacetic acid

A melt of 100 parts of trichlorophenylacetic acid (about 40% 2,4,5-, 40% to 50% 2,3,6- and 10% to 20% 2,3,4-isomers by infrared anlysis) was chlorinated at 120° C. under irradiation by a 250 watt mercury vapor lamp. When one molar equivalent of hydrogen chloride had been evolved, the chlorination was stopped. The product was a gummy, colorless solid of observed neutralization equivalent of 270 (theory for pure $C_8H_4Cl_4O_2$, 274). The analysis of the product for chlorine showed that one molar equivalent of chlorine had been introduced. Refluxing the product with an excess of potassium hydroxide in methanol for three hours hydrolyzed the product with the release of one molar equivalent of chloride ion, proving that one chlorine was on the side-chain.

EXAMPLE 5

*Preparation of technical mixture of α,2,3,6-, α,2,4,5- and α,2,3,4-tetrachlorophenylacetamide via corresponding nitriles*

Chlorine gas was passed into a technical mixture of 2293 parts of trichlorophenylacetonitrile (comprised of approximately 40% to 50% 2,3,6-, 40% to 50% 2,4,5- and 10% to 20% 2,3,4-trichlorophenylacetonitrile, by infrared analysis), at 90° C. to 100° C. until 270 parts of hydrogen chloride had been evolved, requiring seven hours. The resultant product amounted to 2698 parts of α-mono chlorinated trichlorophenylacetonitrile, having the correct nitrogen and chlorine analysis for $C_8H_3Cl_4N$. Thus, the product was about 43% α,2,3,6-, 43% α,2,4,5- and 14% α,2,3,4 tetrachlorophenylacetonitrile. The corresponding halogenated compounds are derived by halogenating the α carbon with the other mentioned halogens in similar molar proportions. Some of the indicated α,2,4,5- compound is present as α,α,2,4,5-.

To 1160 parts of 85% sulfuric acid at 70° C. to 85° C. were added 2270 parts of this alpha chlorinated nitrile mixture over a period of 90 minutes with stirring. Stirring was continued for 15 minutes longer and then the mixture was poured into several volumes of water at 50° C. with stirring. The solidified amide thus obtained was filtered, washed with water, and dried to obtain a colorless solid.

*Analysis.*—Calculated for $C_8H_5Cl_4N$, total Cl=51.7%; total N=5.14%. Found: total Cl=52.8%; total N=5.0%.

EXAMPLE 5

Plots seeded with the various weed species indicated below were sprayed prior to weed emergence with the nitrile and amide of Example 4, at 4 pounds per acre of each chemical. Two weeks later, when weeds had emerged and were growing vigorously in untreated companion plots, the following weed control effects were noted in the treated plots:

| Weed Species | Compound | |
|---|---|---|
| | Amide | Nitrile |
| Quack grass | 2 | 2 |
| Foxtail | 3 | 3 |
| Crab grass | 4 | 4 |
| Johnson grass | 3 | 3 |
| Dock | 4 | 4 |
| Mustard | 3 | 3 |
| Pigweed | 4 | 4 |
| Lamb's-quarters | 4 | 4 |
| Chickweed | 4 | 4 |

Rating Scale:
 0=No effect.
 1=Slight control.
 2=Moderate control.
  (25-75 percent repression of population).
 3=Almost complete control.
  (75-99 percent complete repression of population).
 4=Complete (100 percent) control.

EXAMPLE 6

One part by weight of the product of Example 4 is refluxed for 12 hours with three parts by weight of thionyl chloride. Then aspirator vacuum is applied and the excess thionyl chloride is distilled off, leaving the α-chloro(trichlorophenyl)acetyl chloride as a yellowish oil.

The acid chloride is dissolved in benzene and reacted with the following reagents as indicated to prepare various derivatives:

| Reagent | Quantity* | Conditions | Product | Characteristics |
|---|---|---|---|---|
| Methanol | Excess | Reflux, 2 hrs | Methyl ester | Oil. |
| Amyl alcohol | do | do | Amyl ester | Oil. |
| Butoxyethanol | do | do | Butoxyethyl ester | Oil. |
| Butyl mercaptan | 1 mole | do | Butyl thioester | Oil. |
| Pyridine | 1 mole | | | |
| Hydrogen sulfide | 1 mole | Room temp., 10 hours | Thioanhydride | Wax. |
| Pyridine | 1 mole | | | |
| Water | ½ mole | Room temp., 12 hours | Anhydride | Wax. |
| Pyridine | 1 mole | | | |
| Ethylamine | 2 moles | 5-10° C | N-ethyl amide | Oil. |
| Diethylamine | do | 5-10° C | N,N-diethylamide | Oil. |

*Relative to acid chloride quantity.

Each of these derivatives applied at 20 pounds per acre to soil infested with seeds of ragweed, pigweed, and lamb's-quarters, completely prevents the emergence and growth of these weeds.

EXAMPLE 7

The nitrile described in Example 5 is dissolved in 2,6-lutidine, one molar equivalent of triethylamine is added, and $H_2S$ is passed in until the exotherm subsides. On evaporation, an amorphous solid is obtained having the correct sulfur content for the thioamide, and lacking the C≡N absorption band in the infrared spectrum. This product is useful as a herbicide.

The esters of the invention include, for example, the methyl, ethyl, propyl, butyl, isobutyl, amyl isoamyl, n-hexyl, octyl, nonyl, undecyl, lauryl, myristyl, palmityl, oleyl, stearyl, cyclohexyl, 2-hydroxyethyl, 2-chloroethyl, allyl, phenyl, benzyl, trichlorobenzyl, polychlorophenyl, 1,2-ethylene(bis), glyceryl (mono-, bis or tris-), methoxyethyl furfuryl, and other esters, as well as thio-analogues of these. However, the aliphatic esters, particularly the hydrocarbyl or alkyl esters of 1 to 18 carbon atoms, preferably 1 to 5 carbon atoms, are considered to be best of this class. These esters and thioesters are prepared by refluxing the free acids with the alcohols or thioalcohols or by first reacting the acid with thionyl chloride to prepare the acid chloride, and then refluxing with the alcohol or mercaptan to convert the acid chloride to the ester or thioester. The thioesters are also prepared by reacting the acid chloride with a mercaptide, or by treating the ordinary ester with $P_2S_5$ in refluxing toluene. The esters referred to previously are esters of any of the named or described alpha halo-trihalophenylacetic acids but those of 2,3,4,α-tetra-, 2,3,6,α-tetra-, 2,4,5,α-tetra- and 2,4,5,α,α-pentachlorophenylacetic acid are preferred. Instead of the alkyl esters, esters of alkoxyalkanols of about 2 to 18 carbon atoms and 2 to 8 etheric oxygen atoms may also be employed, e.g., ethoxyethyl-, propoxy propyl-, pentoxy ethyl-, $(C_2H_4O)_3O$-, $(C_2H_4O)_3(C_3H_6O)_4$- ethers may be used.

The compositions of the invention are useful as chemical intermediates. As contrasted with the chlorinated phenylacetics having only ring chlorines which are usually unreactive, the present compounds have reactive halogen atoms on the side-chain which permit a great multiplicity of displacement reactions and, therefore, result in improved utility as chemical intermediates. For example, 2,3,6,α-tetrachlorophenylacetic acid derivatives may be hydrolyzed to 2,3,6-trichloromandelic acid derivatives which have utility as herbicides and chemical intermediates. Treatment of the acid with sodium methylate yields 2,3,6-trichloro-α-methoxyphenylacetic acid which also is a plant growth regulator. The compositions of this invention also have exceptional phytotoxic properties. The new compounds exert a powerful killing action on application to the foliage of plants and are useful as outstanding rapid-acting herbicides, having residual activity. This type of herbicidal activity is surprising and unexpected, since the lower chlorinated phenylacetic acids are either substantially inactive or, as in the case of 2,3,6-trichlorophenylacetic acid, act principally through the soil and by root uptake and are, consequently, slow-acting herbicides. An unexpected and important advantage of the compounds of the invention is their fast weed killing action. The use of mixed isomers is generally preferred for economic reasons. In some cases the activity of mixtures of the compounds of the invention with each other or with other herbicides as named above appears to be greater than additive. The compounds of the invention may be incorporated into mixtures with other herbicides as, for example, the hormonal phenoxyaliphatic acids, sodium chlorate, sodium trichloroacetate, sodium dichloropropionate, and the N-phenyl-N'N'-dialkylurea herbicides together with other formulation adjuvants.

These invented compounds are generally effective when applied in quantities of about one-half pound per acre or more, up to 100 pounds per acre, and, for ease of application, any conventional diluent such as clay, wood flour, fuller's earth, vermiculite, or liquid carrier such as xylene, kerosene, alcohols and ketones or other carrier may be used, depending on the economics and distribution requirements. Formulations may contain emulsifying agents such as sorbital laurates, wetting agents such as sodium alkyl aryl sulfonite and sodium alkyl sulfate, and carriers in accordance with the well-established practices in the herbicidal field.

The examples of the compositions of our invention, and methods of preparing and utilizing them which have been described in the foregoing specification, have been given for purposes of illustration, not limitation. Many other modifications and substitutions of equivalents will naturally suggest themselves to those skilled in the art, based on the present disclosure, and are within the invention.

We claim:
1.

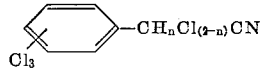

wherein $n$ is from 0 to 1.

2. A compound according to claim 1 wherein the chlorine atoms indicated on the benzene ring are located at the 2, 3 and 6 positions.

3.

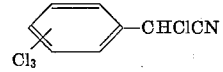

4.

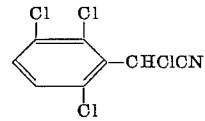

5. A composition comprising alpha,2,3,6-tetrachlorophenylacetonitrile, alpha,2,4,5 - tetrachlorophenylacetonitrile and alpha,2,3,4-tetrachlorophenylacetonitrile.

References Cited
UNITED STATES PATENTS

| | | | |
|---|---|---|---|
| 2,259,869 | 10/1941 | Allen | 260—455 X |
| 2,320,816 | 6/1943 | D'Alelio. | |
| 2,444,905 | 7/1948 | Sexton | 260—465 X |
| 2,790,819 | 4/1957 | Godfrey | 260—465 |

CHARLES B. PARKER, *Primary Examiner.*

DALE R. MAHANAND, B. BILLIAN,
*Assistant Examiners.*

UNITED STATES PATENT OFFICE
CERTIFICATE OF CORRECTION

Patent No. 3,331,865                     July 18, 1967

Edward D. Weil et al.

It is hereby certified that error appears in the above numbered patent requiring correction and that the said Letters Patent should read as corrected below.

Column 1, line 16, for "22,658" read -- 222,658 --; lines 20 to 23, the formula should appear as shown below instead of as in the patent:

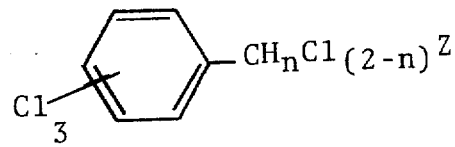

same column 1, line 45, for "alcohol" read -- alcohols --; line 52, for "of" read -- or --; line 59, after "method" insert -- of --; column 2, line 33, for "equilavent" read -- equivalent --; line 61, for "anlysis" read -- analysis --; column 3, line 35, after "$\alpha,\alpha 2,4,5$-" insert -- pentachlorophenylacetylnitrile --; line 45, for "EXAMPLE 5" read -- EXAMPLE 6 --; line 49, for "Example 4" read -- Example 5 --; line 72, for "EXAMPLE 6" read -- EXAMPLE 7 --; column 4, line 29, for "EXAMPLE 7" read -- EXAMPLE 8 --; line 38, for "amyl" read -- amyl, --.

Signed and sealed this 3rd day of September 1968.

(SEAL)
Attest:

EDWARD M. FLETCHER, JR.
Attesting Officer

EDWARD J. BRENNER
Commissioner of Patents